Oct. 11, 1966  E. A. WAHL  3,278,090
VIBRATORY TRAY FEEDER
Filed March 25, 1965  3 Sheets-Sheet 1

EUGENE A. WAHL
INVENTOR.

BY Rudolph J. Lurick
ATTORNEY

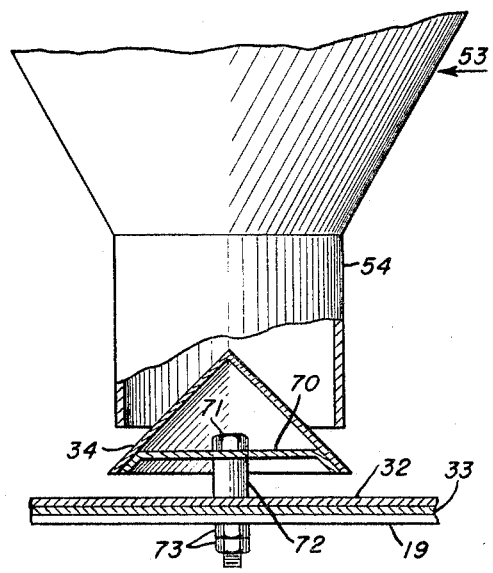

3,278,090
VIBRATORY TRAY FEEDER
Eugene A. Wahl, 294 Forest Ave., Glen Ridge, N.J.
Filed Mar. 25, 1965, Ser. No. 442,723
9 Claims. (Cl. 222—199)

This invention relates to material feeders and more particularly to apparatus for continuously discharging granular or powdered materials at a predetermined constant rate.

Apparatus, of the class to which this invention is directed, is used for feeding a continuous flow of materials, in granular or powdered form, into a process such as, for example, chemicals into a stream of water for purification or treatment. In such applications, it is desirable to provide a continuous flow of the material at a predetermined, precise feed rate.

Various types of volumetric feeders are available. Many of these, however, are not capable of uniform operation with materials having widely different flow characteristics, specifically, dry, free-flowing granular materials and sticky, amorphous powders. Also, under practical operating conditions, powdered materials of the same composition, may vary widely in density. Further, certain materials resist flow under most all conditions of use other than those subject to elaborate moisture control. These variable factors affect the operating accuracy of the feeder.

One prior feeder apparatus which has proven to be satisfactory for feeding a large variety of materials having various flow characteristics, is shown in my United States Patent No. 2,800,252, issued July 23, 1957. Such apparatus comprises a dispensing tube, arranged to receive materials from a supply hopper, and having an auger which is rotated at a predetermined, constant speed. The auger and tube are vibrated, whereby rotation of the auger results in a continuous discharge of the material from the tube at a selected feed rate, which feed rate is determined by the size of the auger and its speed of rotation. This apparatus has an operating accuracy of better than 2 percent, measured on a minute-to-minute basis, even when the particular material falls into the category of materials considered difficult to meter.

Other prior apparatus, of this general class, comprises a vibratory tray spaced from the discharge opening of a supply hopper. The apparatus feed rate is controlled by adjusting the amplitude and/or frequency of tray vibrations, which vibrations are effective to transport the material along the tray surface for discharge from an end thereof. Such apparatus has several shortcomings. The feed rate is not linearly related to the vibration amplitude and/or frequency. More importantly, by reason of its construction, this type of apparatus is very sensitive to the level of the material in the supply hopper, whereby the feed rate may vary by 100 percent between hopper full and hopper substantially empty conditions. Also, the tray area, directly under the hopper discharge opening, accumulates material under varying degrees of packing. In consequence, such feeder apparatus generally has an operating accuracy of about 15 percent.

Feeder apparatus, made in accordance with this invention, is of the vibratory tray type but so constructed as to overcome the shortcomings of existing such feeders, whereby the apparatus has an operating accuracy equal to that of the vibratory auger feeder mentioned above.

An object of this invention is the provision of a vibratory tray feeder, of novel construction, and improved operating accuracy.

An object of this invention is the provision of feeder apparatus for dispensing granular, or powdered materials, at a constant, predetermined feed rate, which apparatus is of simple, rugged construction and of positive and highly accurate operation.

An object of this invention is the provision of a material feeder of the vibratory tray class, which apparatus includes means for discharging material from a supply hopper so as to maintain a substantially constant level of the material over the tray.

An object of this invention is the provision of a vibratory tray feeder for discharging granular, or powdered materials, at a constant, precise rate, which feeder is capable of operating with a variety of materials having different flow characteristics.

An object of this invention is the provision of a vibratory tray feeder wherein the amplitude and frequency of vibrations imparted to the tray are constant and the feed rate is adjustable by controlling the quantity of material flowing from a supply hopper onto the tray surface.

An object of this invention is the provision of a vibrating tray feeder comprising a supply hopper for the material and having a discharge opening spaced from the tray surface, an auxiliary hopper directing material flow from the supply hopper to the tray and means for simultaneously vibrating the tray and auxiliary hopper thereby to transport the material along the tray for discharge at an end thereof.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 3 is an enlarged, fragmentary view, with parts broken away and showing a structural modification wherein the base of the conical deflector member is spaced from the bottom wall of the tray.

Figure 1:
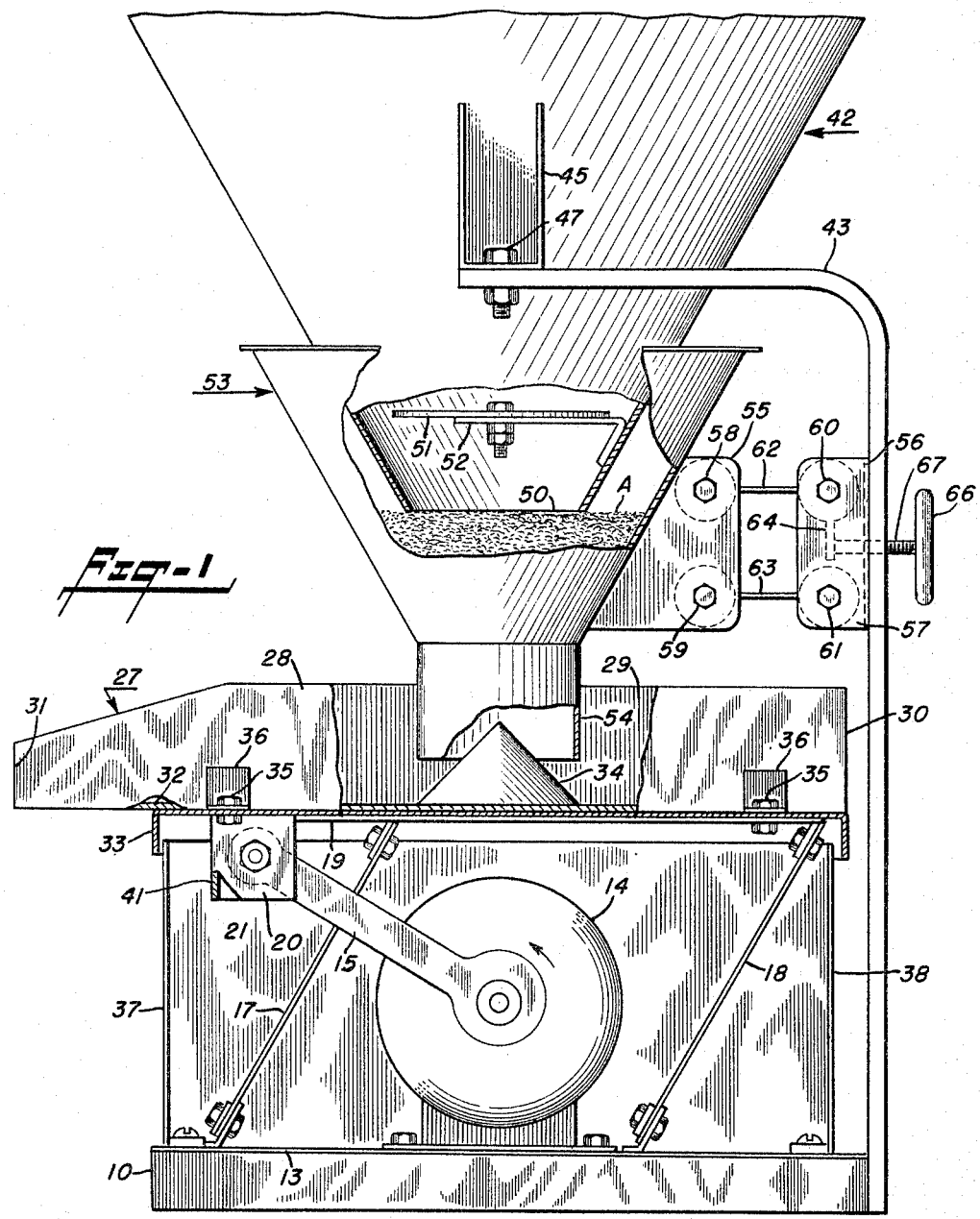
FIGURE 1 is a side elevational view of a material feeder made in accordance with this invention, with parts broken away and parts in section.
Figure 2:
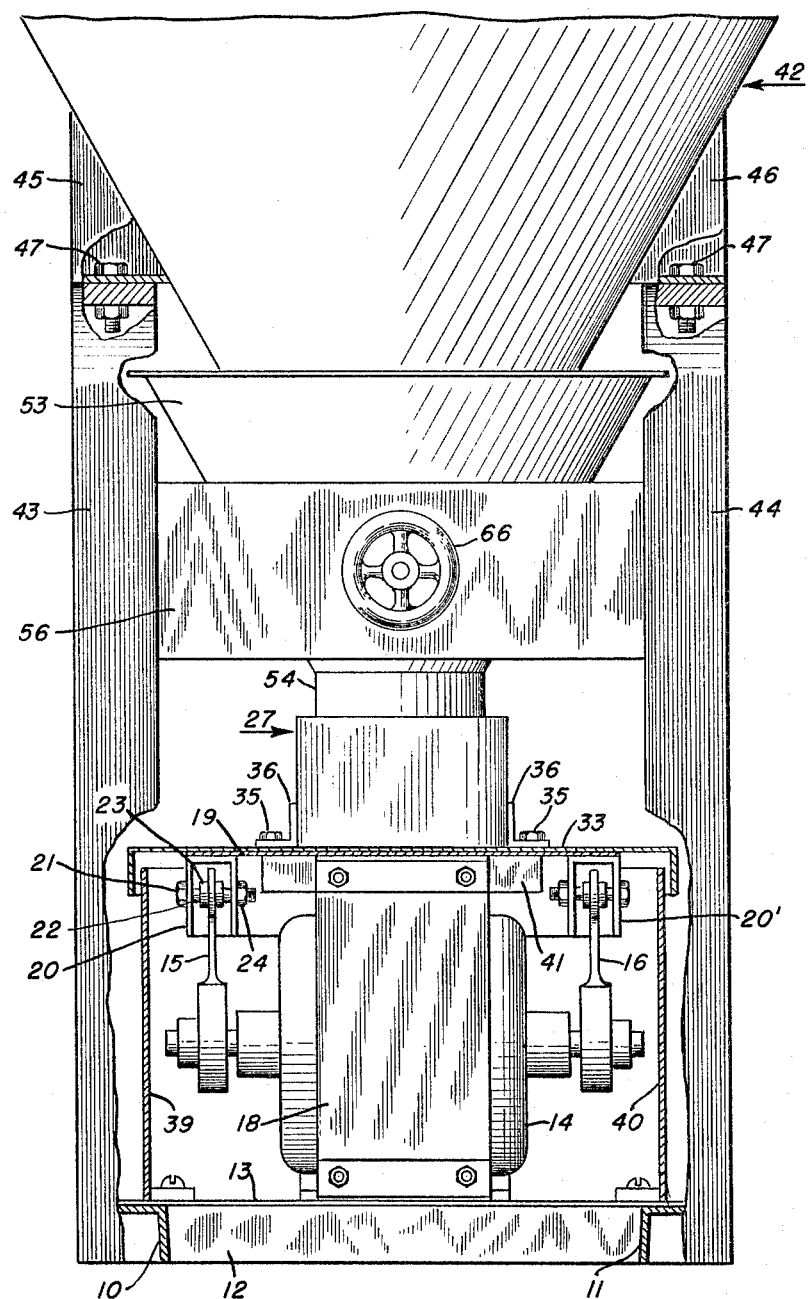
FIGURE 2 is a rear elevational view thereof.

Reference now is made to FIGURES 1 and 2. The apparatus is supported on a base formed of a pair of longitudinally extending angle irons 10 and 11, having welded thereto a suitable number of transverse angle irons 12. A base plate 13 spans the angle irons and is welded thereto. A synchronous electric motor 14 is secured in position on the base plate, said motor having a double-ended drive shaft carrying a pair of eccentrically-mounted crank arms 15 and 16. A pair of flexible leaf springs 17 and 18 each have lower ends secured to the base plate 13 by means of suitable cleats and bolts, and upper ends similarly secured to a tie plate 19.

As best shown in FIGURE 2, a pair of U-shaped brackets 20 and 20' extend downwardly from the tie plate 19, each bracket having its base portion welded to the said plate. Referring, specifically, to the bracket 20, such bracket is provided with aligned holes receiving a mounting bolt 21, which bolt passes through a tubular steel bushing 22 having secured thereto a vulcanized rubber sleeve 23 of about 3/16 inch wall thickness. The bushing has an axial length greater than that of the rubber sleeve and, therefore, has its ends in contact with the legs of the bracket 20 when the nut 24 is tightened on the bolt 21. The rubber sleeve is force-fitted into a hole formed in the end of the crank arm 15. Thus, the sleeve and its supporting bushing are secured against rotation relative to the crank arm. However, there is sufficient torsional resilience in the rubber to permit small angular movement of the crank arm about the bushing clamping bolt 21.

A similar bushing and rubber sleeve are carried by the other U-shaped mounting bracket 20′ and the crank arm 16 is similarly coupled thereto. This arrangement provides rattle-free connection joints between the crank arms and the cross plate 19, which joints have considerable torsional freedom but great radial stiffness to transmit the push and pull forces of the crank arms to the attached assembly. By using two crank arms, one at each end of the motor shaft, the reactive forces are distributed equally to both of the motor bearings. Also, the described arrangement delivers equal motivation to both sides of the cross plate 19.

The tray, or trough 27, has side walls 28, 29, a rear wall 30 and an open end 31 constituting the material discharge end of the apparatus. The bottom wall 32, of the trough, rests upon and is welded to a supporting plate 33, which plate has off-set, downwardly depending sides. A conical deflecting member 34 has its base welded to the trough bottom. The described unitary assembly of the conical member, trough and tie plate is removably secured to the cross plate 19 by means of mounting bolts 35 passing through aligned holes formed in the supporting and cross plates, and holes formed on the L-shaped external brackets 36, which brackets are welded to the side walls of the trough. It may here be pointed out that the purpose of the tie plate 19 is to the tie the front and rear leaf springs 17 and 18 together, to support the U-shaped brackets which carry the bushings coupled to the crank arms, and to provide a means for removably securing the trough in position. This permits assembling the complete working portion of the apparatus prior to enclosing the motor and leaf springs by four vertical panels, such as the front and rear panels 37 and 38 visible in FIGURE 1 and the two side panels 39 and 40 visible in FIGURE 2. It is also here pointed out that a transverse angle iron 41 is welded to the tie plate 19 and extends proximate to the points where the crank arms are coupled to the tie plate through the U-shaped brackets 20, 20′. This angle iron serves to transmit movement of the crank arms to the supporting plate 33 and trough 28, undiminished by any flexing that might otherwise occur in the supporting plate.

A conical supply hopper 42 is supported in axial alignment with the conical deflecting member 34 by the two vertical posts 43 and 44. These posts have lower ends welded to the base angle irons 10 and 11 and the upper ends thereof are off-set and span the hopper. A pair of external, generally U-shaped mounting brackets 45 and 46 are welded to diametrically-opposed portions of the hopper wall, whereby the hopper is removably secured in position by fastening bolts 47 and cooperating nuts, said bolts passing through aligned holes provided in the brackets and posts. The hopper discharge opening is identified by the numeral 50. Spaced somewhat from the discharge opening is a circular baffle plate 51 secured to a relatively narrow strap 52, which strap has an off-set end secured to the hopper wall. Such baffle plate removes the head load of the contained material from the region of the hopper discharge opening and the flow path of the material out of the hopper is defined by the annular space between the peripheral surface of the baffle plate and the proximate sloping wall of the hopper. The baffle plate also serves to prevent discharge of material predominantly along the hopper axis, thereby preventing possible rat-holing of the material and providing for a discharge of the material substantially on a first-in, first-out basis.

An auxiliary, funnel-shaped member, or hopper, 53 is positioned between the supply hopper and the conical deflecting member 34 secured to the trough bottom. The auxiliary hopper has a cylindrical downspout 54 secured thereto, along a plane defining the truncated apex, and the base portion extends in spaced relation along the lower portion of the hopper wall. Secured to the auxiliary hopper are a pair of spaced plates, the forward such plate 55 being visible in FIGURE 1. A similar pair of spaced plates are secured to a cross plate 56 (see, particularly, FIGURE 2), which cross plate has ends welded to the upright posts 43 and 44, the forward one of such plates 57 being visible in FIGURE 1. Each pair of these plates is provided with aligned holes accommodating the bolts 58–61. Each such bolt passes through a metal bushing positioned between the associated plates, such bushings being shown in dotted lines in FIGURE 1. The upper set of the two bushings are secured together by a rigid metal link 62 and the lower set of the two bushings are secured together by a similar link 63. It will be clear that each bushing is rotatable about its supporting bolt. It will also be noted that the right hand bushing of the upper set, that is, the bushing rotatable about the bolt 60, has a tab 64 depending therefrom. A hand wheel 66 is secured to a threaded rod 67, which rod passes through a threaded hole formed in the cross plate 56 and serves as a stop for the tab 64.

The described arrangement constitutes a conventional parallelogram linkage mechanism whereby rotation of the hand wheel effects a lowering or raising of the supported auxiliary hopper 53 while maintaining the said hopper in vertical position at all times. Such vertical adjustment of the auxiliary hopper changes the spacing between the lower, open end of the downspout 54 and the outer surface of the conical deflecting member 34, and it is this spacing which determines the rate of flow of the material into the trough. As long as this spacing, or gap, remains constant, the feed rate of the apparatus remains constant within ±2 percent maximum deviation, minute-to-minute.

Rubber-covered bushings, such as those identified by the numerals 22 and 23, in FIGURE 2, may be used in the parallelogram linkage mechanism in place of the simple metal bushings described, thereby to eliminate rattle.

The operation of the apparatus will now be described. Upon energization of the motor 14, the orbital gyrations of the crank arms 15 and 16 impart corresponding vibrations to the trough 28, in the direction of the crank arms. Such trough vibrations have directional force vectors such that material in the trough is vibratorily transported along the trough and discharged at the open end 31 thereof. At the same time, reactive vibrations are transmitted from the motor to the vertical posts 43 and 44, through the apparatus base. These vibrations, which are imparted to the main supply hopper 42 and the auxiliary hopper 53, are of considerably lower amplitude than those imparted to the trough, which condition results in the maintenance of a substantially constant level (A) of the material in the auxiliary hopper. In consequence, operation of the apparatus is insensitive to the level of the material within the main hopper. The intensity of the vibrations applied to the two hoppers is sufficient to assure a positive and continuous flow of the material from the main hopper to the auxiliary hopper and from the latter to the trough. These features are conducive to the maintenance of a constant, precise, apparatus feed rate.

The material stream flows out of the downspout 54 along the lower surface portion of the conical deflecting member 34. That portion of the material stream which flows into the trough at the rear portion of the cone is vibratorily moved along the outer surface thereof and combines with that portion of the material stream which flows into the trough along the forward portion of the cone. An inherent characteristic of a vibrating trough, as described, is a spreading of the material across the entire trough into a stream of substantially uniform depth. Such stream is discharged from the apparatus as long as material is supplied to the main supply hopper, either continuously or on a batch basis.

The vibration amplitude and frequency of the trough vibrations remain constant and control of the apparatus feed rate is effected by rotation of the hand wheel 66 to change the gap spacing between the downspout 54 and the conical deflection member 34. This eliminates the need for a costly motor control and/or a variable reduction gearing system, thereby affording significant manufacturing economy. Further, the described arrangement provides a positive method of controlling the feed rate and the relationship between the gap spacing and feed rate is linear.

The sticking, bridging and compacting of the material is most critical at the point of maximum constriction of the material flow path. With the apex of the conical deflecting member 34 extending into the downspout, to an extent determined by the position of the auxiliary hopper, there is considerable agitation of the material in this region, thereby resulting in a positive and uniform flow of material out of the downspout and into the trough. The stream of material, issuing from downspout 54, receives lateral impulses from cone 34 and thereby readily discharges from the orifice area. In previous vibratory tray feeds, which do not use such a cone, material issuing from the hopper outlet flows directly against the trough floor. The interior of this column of material is thus pressed against the trough floor by the weight of material above, and alternately adheres to this area of the trough or releases, thereby causing considerable fluctuation in feed rate.

A modification of the conical deflecting member is shown in the enlarged, fragmentary view of FIGURE 3. Here are shown the tie plate 19, the cross plate 33 and the trough bottom 32. A strap 70 extends across the conical member 34 and has off-set ends welded thereto. A bolt 71 passes through a hole formed in the strap, through a bushing 72 and through aligned holes formed in the trough bottom and the underlying plates. The two nuts 73 serve to lock the assembly in place. In this construction, the base of the conical member 34 is spaced from the trough bottom so that the only obstruction to material flow along the trough is the relatively small bushing 72. This construction allows the entire circular outlet of the downspout, operating in conjunction with the entire circumference of the cone, to function as a metering orifice. With the cone flush against the trough bottom, the metering orifice constitutes, namely, the front half of the downspout outlet and cone combination. Thus, the feed rate capacity of the apparatus is increased, substantially, by the construction shown in FIGURE 3.

Having now described the invention, those skilled in this art will be able to make various changes and modifications without thereby departing from the spirit and scope of the invention as recited in the following claims.

I claim:

1. Apparatus for discharging granular or powdered materials at a predetermined rate, comprising,
    (a) a vertically-disposed supply hopper having a sloping bottom terminating in a discharge opening.
    (b) a generally funnel-shaped auxiliary hopper having a base spaced from the wall of the supply hopper and lying in a plane above that containing the discharge opening of the supply hopper, said auxiliary hopper terminating in a hollow cylindrical downspout,
    (c) an elongated trough having an open end,
    (d) an inverted conical member carried by the trough and having an apex extending into the said downspout,
    (e) means for adjusting the axial spacing between the downspout and the conical member, and
    (f) means vibrating the trough to vibratorily move material toward the open end thereof and simultaneously vibrating the supply and auxiliary hoppers.

2. The invention as recited in claim 1, wherein the amplitude of the trough vibrations is greater than that of the hopper vibrations.

3. Apparatus for discharging granular or powdered materials at a predetermined rate, comprising,
    (a) a base,
    (b) a set of flexible leaf springs carried by the base,
    (c) an elongated trough having an open end and supported by said leaf springs,
    (d) an inverted conical member carried by the trough,
    (e) an electric motor carried by the base,
    (f) a pair of crank arms carried eccentrically by the motor drive shaft and mechanically coupled to said trough,
    (g) a supply hopper having a sloping bottom terminating in a discharge opening, said hopper being supported on the said base and spaced from said trough,
    (h) a generally funnel-shaped auxiliary hopper having a hollow cylindrical downspout,
    (i) means supporting said auxiliary hopper on the base with the base portion thereof spaced from the wall of the supply hopper and lying in a plane above that containing the discharge opening of the supply hopper, and the downspout substantially concentric with the said conical member, and
    (j) means to adjust the position of the said auxiliary hopper relative to the trough thereby to change the spacing between the said conical member and the said downspout.

4. The invention as recited in claim 3, wherein the supply hopper and the auxiliary hopper are supported on the base by a pair of vertical posts.

5. The invention as recited in claim 4, wherein the said means to adjust the position of the auxiliary hopper comprises a parallelogram linkage mechanism carried by the said posts and mechanically coupled to the auxiliary hopper.

6. The invention as recited in claim 3, wherein the base edge of said inverted conical member is secured to the trough bottom and the apex extends into the said downspout.

7. The invention as recited in claim 3, wherein the base edge of said inverted conical member is spaced from the trough bottom and the apex extends into the said downspout.

8. The invention as recited in claim 3, wherein the said motor has a drive shaft extending from both sides of the motor housing and the said crank arms are disposed on opposite sides of the motor housing.

9. Apparatus for discharging granular or powdered material at a predetermined constant rate, comprising,
    (a) a base,
    (b) a set of flexible leaf springs having ends secured to said base,
    (c) an elongated trough having an open end and supported by the leaf springs,
    (d) an inverted conical member carried by the trough,
    (e) a synchronous motor carried by the base and having a double-ended drive shaft,
    (f) a pair of eccentrically-mounted crank arms carried by the motor shaft and disposed on opposite sides of the motor,
    (g) a pair of posts secured to and extending vertically from the said base,
    (h) a supply hopper supported by said posts, said hopper having a discharge opening in the bottom,
    (i) an auxiliary hopper having a hollow cylindrical downspout axially aligned with and encircling the said conical member, the base of the auxiliary hopper being spaced from the wall of the supply hopper and lying in a plane above that containing the discharge opening of the supply hopper,
    (j) a first pair of spaced, supporting plates secured to the outer surface of the auxiliary hopper,
    (k) a second pair of spaced supporting plates aligned with the said first pair and carried by the vertical posts, (l) a first pair of bushings pivotally carried by the said first pair of supporting plates,
(m) a second pair of corresponding bushings pivotally carried by the said second pair of supporting plates,
(n) individual rigid links connected to corresponding ones of said first and second pair of bushings, and
(o) manually operable means for rotating one of the bushings of the said second pair, thereby to vary the axial spacing between the said downspout and the said conical member.

References Cited by the Examiner

UNITED STATES PATENTS

| | | | |
|---|---|---|---|
| 2,095,283 | 10/1937 | Peale | 222—199 X |
| 2,690,857 | 10/1954 | Vergobbi | 222—227 X |
| 2,869,592 | 1/1959 | Krueger | 222—199 X |
| 3,178,068 | 4/1965 | Dumbaugh | 222—161 |

ROBERT B. REEVES, *Primary Examiner.*

STANLEY H. TOLLBERG, *Examiner.*